US008463126B2

(12) United States Patent
Sakurai

(10) Patent No.: US 8,463,126 B2
(45) Date of Patent: *Jun. 11, 2013

(54) OPTICALLY VARIABLE FILTER ARRAY APPARATUS

(75) Inventor: Yasuki Sakurai, Aichi (JP)

(73) Assignee: Santec Corporation, Komaki (JP)

( * ) Notice: Subject to any disclaimer, the term of this patent is extended or adjusted under 35 U.S.C. 154(b) by 350 days.

This patent is subject to a terminal disclaimer.

(21) Appl. No.: 12/878,599

(22) Filed: Sep. 9, 2010

(65) Prior Publication Data
US 2011/0293281 A1 Dec. 1, 2011

(30) Foreign Application Priority Data

May 28, 2010 (JP) .................. 2010-122689

(51) Int. Cl.
*H04J 14/02* (2006.01)
*H04B 10/00* (2006.01)

(52) U.S. Cl.
USPC .............................. 398/79; 398/138; 398/139

(58) Field of Classification Search
USPC .......................................................... 398/79
See application file for complete search history.

(56) References Cited

U.S. PATENT DOCUMENTS

| 6,449,410 | B1  |   | 9/2002 | Que             |         |
|-----------|-----|---|--------|-----------------|---------|
| 6,628,383 | B1  | * | 9/2003 | Hilliard        | 356/305 |
| 6,776,510 | B1  | * | 8/2004 | Shimaoka et al. | 362/298 |
| 8,346,086 | B2  | * | 1/2013 | Suzuki et al.   | 398/79  |
| 2002/0176149 | A1 | * | 11/2002 | Davis et al. | 359/290 |
| 2002/0176151 | A1 | * | 11/2002 | Moon et al. | 359/298 |
| 2009/0263142 | A1 |   | 10/2009 | Shen et al. | |

FOREIGN PATENT DOCUMENTS

| JP | 05-196910 A  | 8/1993 |
| JP | 11-023891 A  | 1/1999 |
| JP | 2000-028931 A | 1/2000 |

OTHER PUBLICATIONS

J. D. Berger et al., "Widely Tunable, Narrow Optical Bandpass Gaussian Filter Using a Silicon Microactuator," in Optical Fiber Communication Conference, Technical Digest (Optical Society of America, 2003), paper TuN2, Mar. 25, 2003, Atlanta, Georgia.

* cited by examiner

*Primary Examiner* — Kenneth N Vanderpuye
*Assistant Examiner* — Abbas H Alagheband
(74) *Attorney, Agent, or Firm* — McGlew and Tuttle, P.C.

(57) ABSTRACT

In an optically variable filter array apparatus, WDM-signal light beams of m channels ranging in wavelength from $\lambda_1$ to $\lambda_n$ from optical fibers 11-1 to 11-*m* enter wavelength dispersion element 17 through concave mirror 16. Wavelength dispersion element disperses incident light beams in different directions according to their wavelengths and direct them to a concave mirror 18. In concave mirror, light beams of different channels are turned into strip-like parallel light beams and developed over xy plane according to channel and wavelength. Wavelength selection element 19 has pixels arranged in lattice pattern, for bringing a pixel at a position corresponding to to-be-selected channel and wavelength into a reflective state. Light beams reflected from wavelength selection element pass through the same path to exit from optical fibers 15-1 to 15-*m*. By changing reflection characteristics of wavelength selection element on a pixel-by-pixel basis, desired wavelengths of given WDM light can be selected.

9 Claims, 14 Drawing Sheets

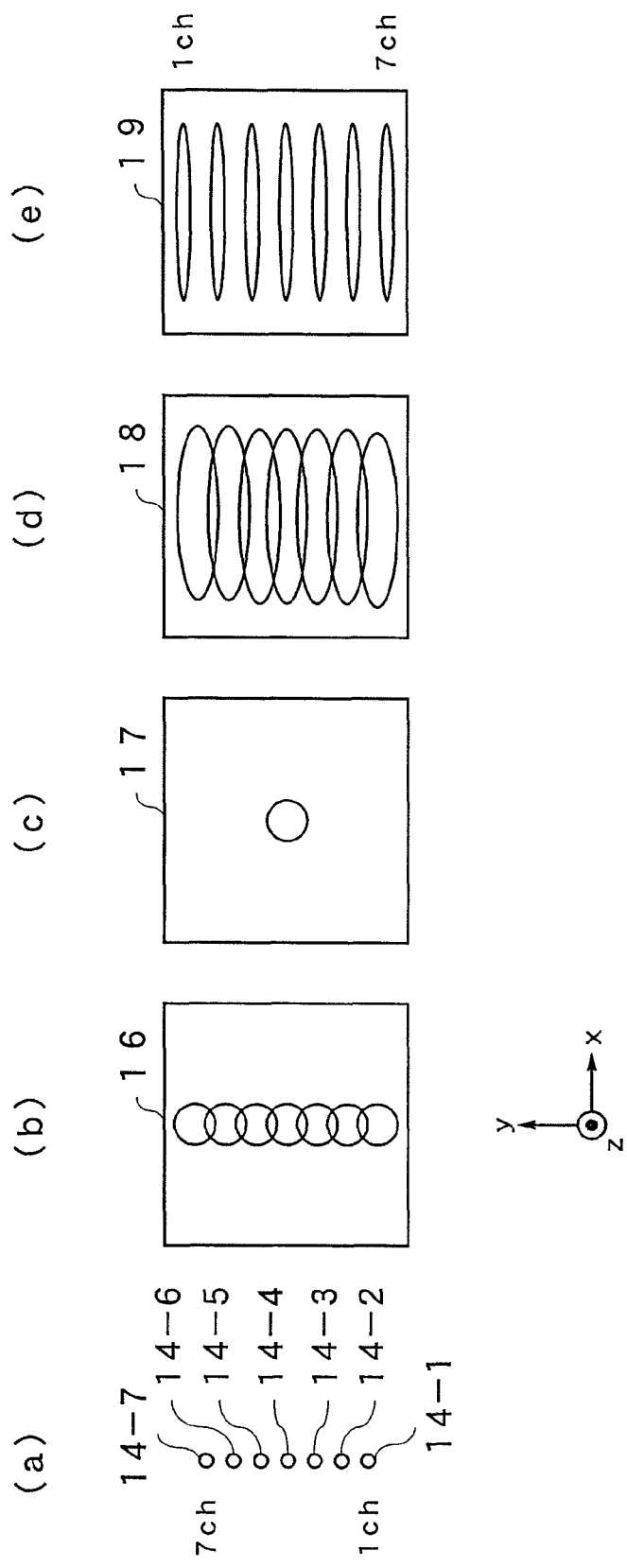

OPTICALLY VARIABLE FILTER ARRAY APPARATUS

BACKGROUND OF THE INVENTION

1. Field of the Invention

The present invention relates to an optically variable filter array apparatus suitable for use in selection of WDM signals.

2. Discussion of the Related Art

At present ROADM (Reconfigurable Optical Add Drop-multiplexing) nodes for WDM (Wavelength Domain Multi-plex) communication systems are required to offer a sophisticated colorless Add-Drop function, or equivalently the capability of effecting separation and addition of optical signals having desired wavelengths. As exemplary of methods to achieve a colorless feature, there is known a structure using a wavelength variable filter array (TFA) for selecting a plurality of input signals from among input WDM signals. In Japanese Unexamined Patent Publication JP-A 11-23891 (1999) and Japanese Unexamined Patent Publication JP-A 5-196910 (1993) as well, as a wavelength variable filter array structure of conventional design, there is proposed an optically variable filter that utilizes variation in cavity length resulting from an electrical-field effect in a liquid crystal element. Moreover, in Japanese Unexamined Patent Publication JP-A 2000-28931 and U.S. Pat. No. 6,449,410 as well, there is proposed a wavelength variable filter for varying selected wavelengths by exploiting variation in cavity length resulting from mechanical alteration in MEMS. Further, in US 2009/0263142 A1, there is proposed a filter constructed by inte-grating a multiplicity of filter elements on a waveguide utilizing Thermo-Optical effects (TO effects) exerted by the waveguide. Still further, in Conference paper TuN2 of OFC 2003 by J. Berger, F. Ilkov, D. King, A. Tselikov, and D. Anthon, there is presented a tunable filter constructed of a combination of a diffraction grating and MEMS. In this case, MEMS and input-output optical fibers designed in an array form can be utilized as a TFA.

SUMMARY OF THE INVENTION

Since a WDM modulated signal exhibits a spread of spectral components on a frequency axis, as a filter configuration, a flat-top spectral waveform pattern is desirable that is characterized by inclusion of signal spectral components and low level of crosstalk between adjacent channels. However, the filter configuration of a Fabry-Perot interferometer is of Lorentzian type, which is unsuitable for a filter for selecting specific wavelengths of WDM signals due to too narrow a peak range of a selected wavelength. Furthermore, in the filter disclosed in US 2009/0263142 A1, because of the exploitation of TO effects, there arises the problem of an increase in power consumption ascribable to array configuration. In addition, in the filter presented in Conference paper TuN2 of OFC 2003 by J. Berger, F. Ilkov, D. King, A. Tselikov, and D. Anthon, the filter configuration is of Gaussian-waveform pattern and is therefore, just like others of the conventional art, unsuitable for a filter for WDM signals.

The present invention has been made with consideration given to the drawbacks associated with the conventional art, and accordingly its object is to provide an optically variable filter array apparatus capable of input of WDM signals corresponding to a plurality of channels and selecting a desired wavelength with respect to a given channel.

An optically variable filter array apparatus of the present invention comprises: an entrance/exit section for a plurality of channels arranged along a y axis, which receives WDM signal light beams of a first to m-th channels, each of which is composed of multi-wavelength light, and allows exit of optical signals of selected wavelengths on a channel to channel basis; a first light condensing element which condenses said WDM signal light beams of different channels; a wavelength dispersion element which spatially disperses said WDM light beams condensed by said first light condensing element according to their wavelengths; a second light condensing element which condenses said WDM light beams of different channels dispersed by said wavelength dispersion element; a wavelength selection element which has a multiplicity of pixels that are arranged in a direction of an x axis according to wavelength, are placed so as to receive incoming beams of m channels arranged at different positions with respect to the y axis so as to be developed over an xy plane, and are arranged in a lattice pattern on the xy plane, and which selects light in a desired number of wavelength bands with respect to said light beams by changing reflection characteristics of each of the pixels arranged in a two-dimensional fashion; and a wavelength selection element driving unit which drives an electrode for each of the pixels arranged in the x-y directions of said wavelength selection element to control light reflection characteristics of a pixel lying at a predetermined position in the x-axis direction as well as in the y-axis direction, wherein at least one of said first light condensing element and second light condensing element is of a concave mirror.

In the optically variable filter array apparatus, said first light condensing element and said second light condensing element may be each constructed of a single concave mirror.

In the optically variable filter array apparatus, said first light condensing element may have a light condensing lens and an optical-path turning element for turning a path of light.

In the optically variable filter array apparatus, said second light condensing element may have a light condensing lens and an optical-path turning element for turning a path of light.

In the optically variable filter array apparatus, said wavelength selection element may be a two-dimensional liquid crystal element, and said wavelength selection element controls a voltage to be applied to each pixel in accordance with a wavelength of a channel to be selected.

In the optically variable filter array apparatus, said wavelength selection element may be an LCOS element.

In the optically variable filter array apparatus, said LCOS element may be so designed that a plurality of pixels are assigned to a position at which light in a single wavelength band of a single channel of a WDM signal is incident.

In the optically variable filter array apparatus, said wavelength selection element may be a two-dimensional liquid crystal array element.

In the optically variable filter array apparatus, said wavelength selection element may be a MEMS array having a plurality of pixels arranged in a two-dimensional fashion.

As particularized heretofore, according to the present invention, by making various changes to the reflection characteristics and transmission characteristics of a wavelength selection element, it is possible to select light of a desired wavelength with respect to each of multi-channel WDM signals on an individual basis. Moreover, by designing at least one of a first light condensing element and a second light condensing element as a concave mirror, an optical system can be made smaller in size. Further, the use of a wavelength selection element having a plurality of pixels assigned to each wavelength band makes it possible to vary wavelength selection characteristics freely.

BRIEF DESCRIPTION OF THE DRAWINGS

FIG. 1C is a diagram showing each individual optical element as seen from the front;

DESCRIPTION OF THE PREFERRED EMBODIMENTS

First Embodiment

Figure 1A:
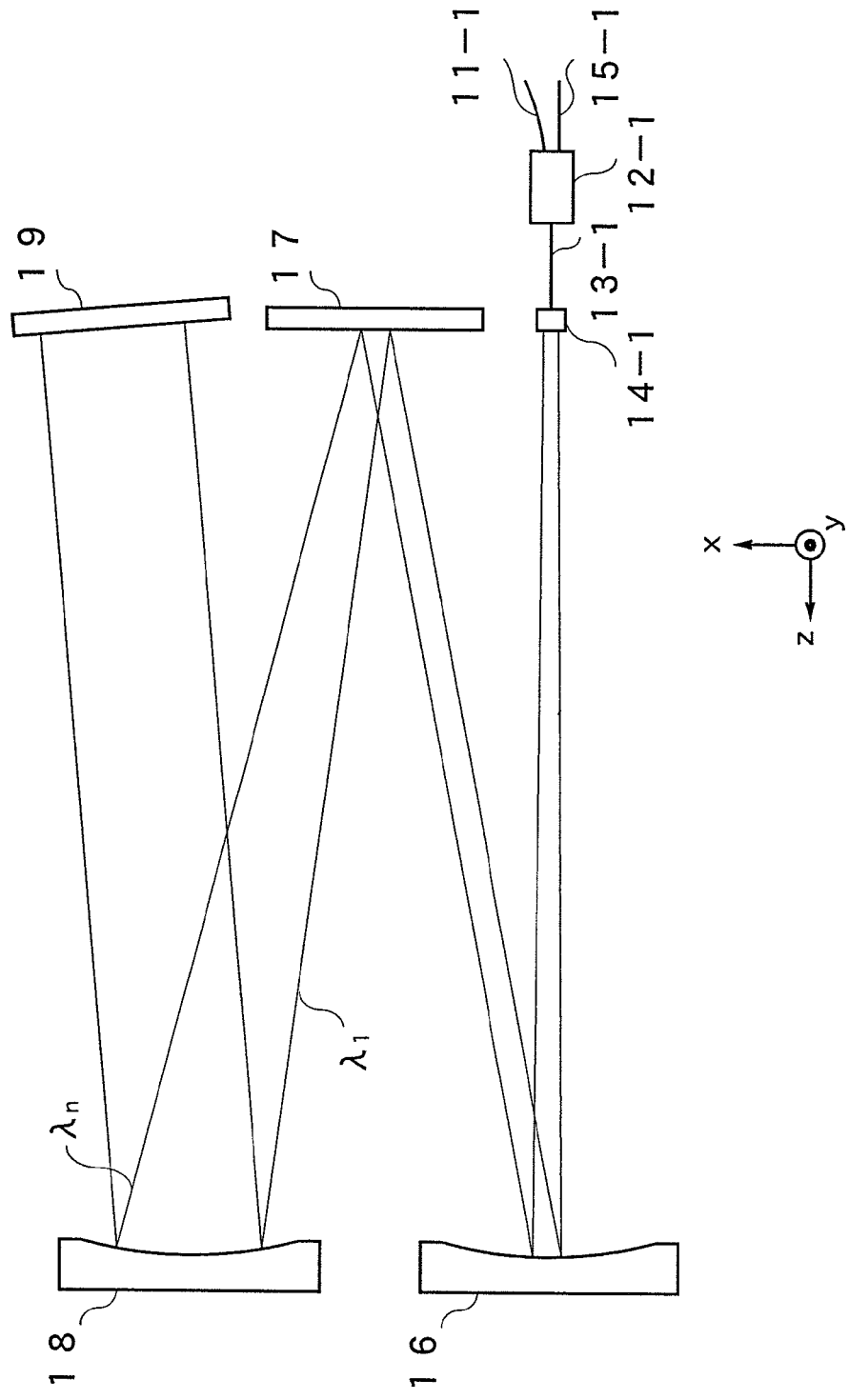
FIG. 1A is a diagram showing the optical arrangement of a reflection-type optically variable filter array apparatus in accordance with a first embodiment of the present invention as seen in the direction of a y axis.
Figure 1B:
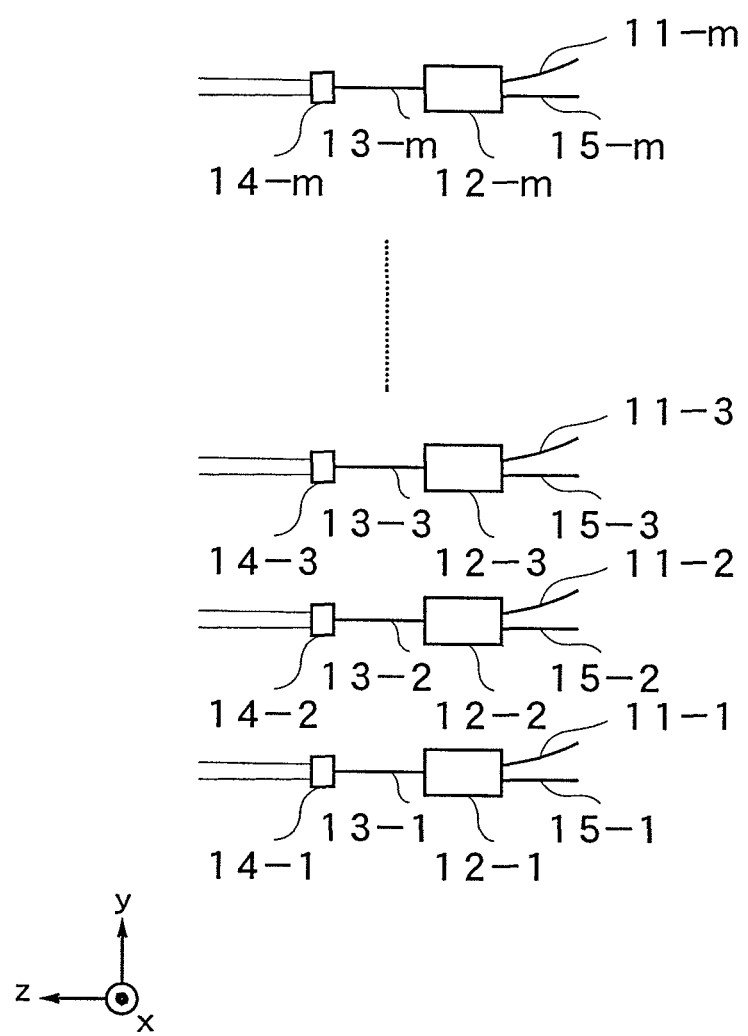
FIG. 1B is a diagram showing an entrance/exit section of the reflection-type optically variable filter array apparatus in accordance with the first embodiment as seen in the direction of an x axis.

FIG. 1A is a side view showing the configuration of optical elements constituting a reflection-type optically variable filter array apparatus in accordance with a first embodiment of the present invention as seen in the direction of a y axis. FIG. 1B is a side view showing an entrance/exit section of the apparatus as seen in the direction of an x axis. FIG. 1C is a diagram showing each of the optical elements as seen from the front. Incoming light is WDM signal light corresponding to m channels, and WDM light of each channel results from multiplexing of optical signals ranging in wavelength from $\lambda_1$ to $\lambda_n$. Herein "m" is represented as "7" in the diagram. The beams of WDM light of the first to m-th channels are fed, through optical fibers 11-1 to 11-$m$, respectively, to circulators 12-1 to 12-$m$, respectively. The beams of incoming light can be either inputted to their respective circulators 12-1 to 12-$m$ via their respective optical fibers 11-1 to 11-$m$ or inputted directly to the circulators. The circulators 12-1 to 12-$m$ allow the incoming light beams to exit, through optical fibers 13-1 to 13-$m$, respectively, to collimator lenses 14-1 to 14-$m$, respectively, and also allow light beams coming from the optical fibers 13-1 to 13-$m$, respectively, to exit to optical fibers 15-1 to 15-$m$, respectively. In a part (a) of FIG. 1C, there are shown light beams exiting from the collimator lenses 14-1 to 14-$m$, respectively, arranged along the y axis. Moreover, the light beams that exited from their respective collimator lenses 14-1 to 14-$m$ via their respective optical fibers 13-1 to 13-$m$ have an optical axis aligned with the z-axis direction, and are parallel to each other in the y-axis direction.

Figure 2A:
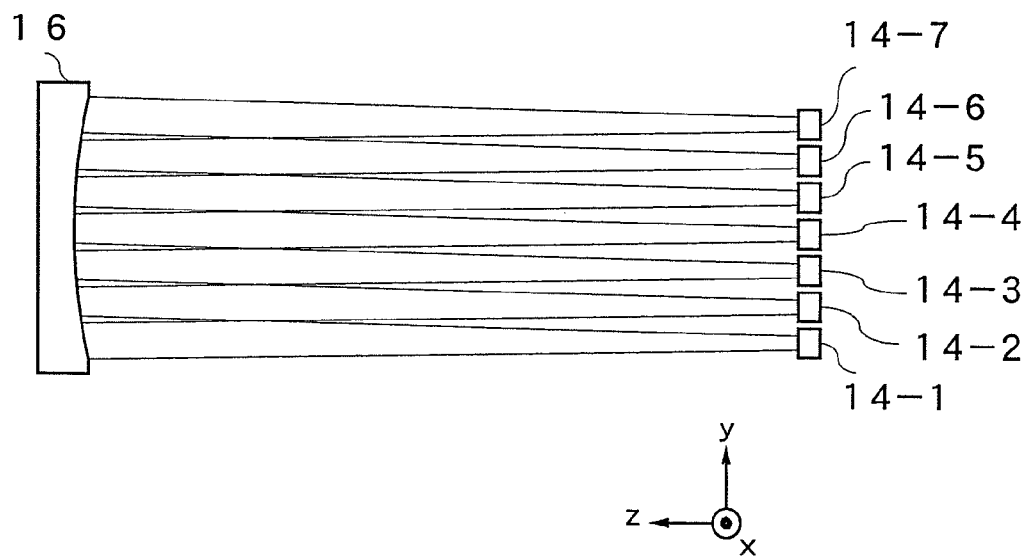
FIG. 2A is a diagram showing light beams traveling between a collimator lens and a first light condensing element as seen in the x-axis direction.
Figure 2B:
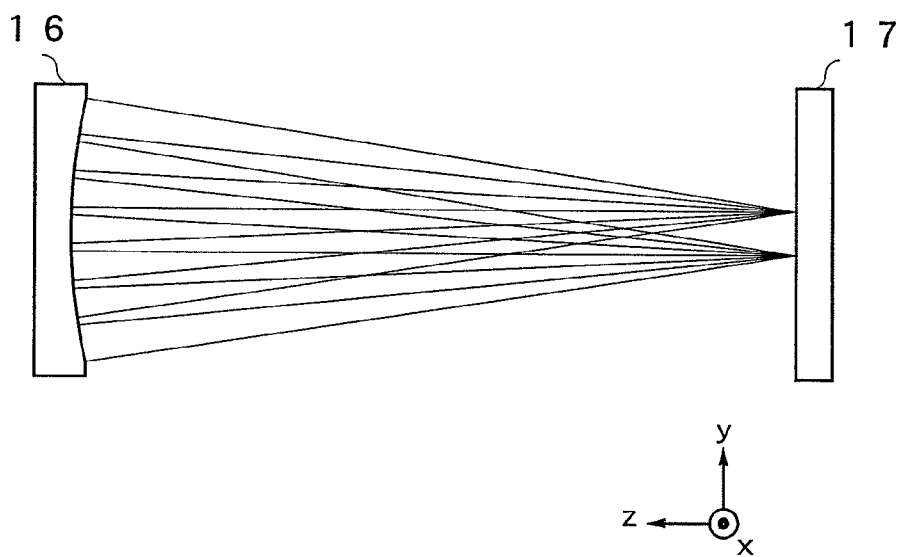
FIG. 2B is a diagram showing light traveling from the first light condensing element to a wavelength dispersion element as seen in the x-axis direction.
Figure 2C:
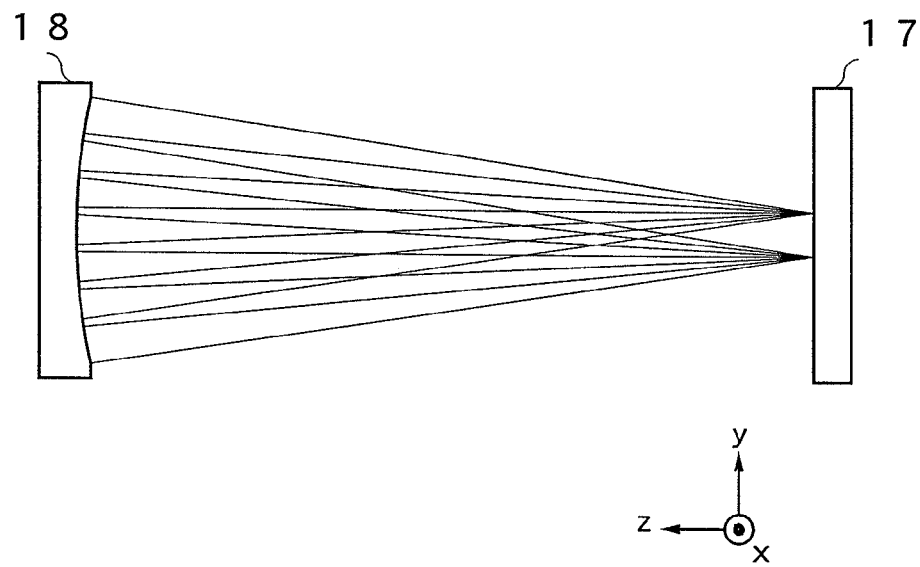
FIG. 2C is a diagram showing light traveling from the wavelength dispersion element to a second light condensing element as seen in the x-axis direction.
Figure 2D:
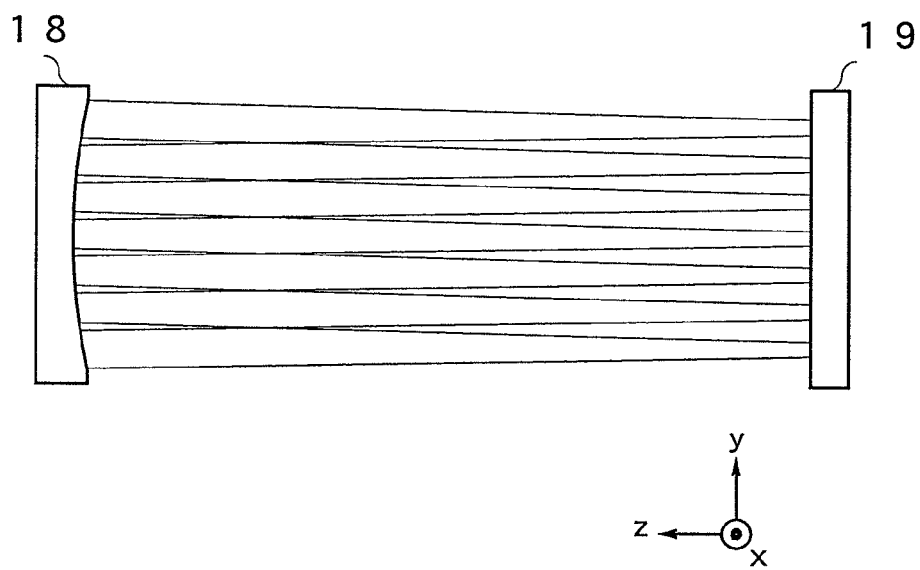
FIG. 2D is a diagram showing light traveling from the second light condensing element to a wavelength selection element as seen in the x-axis direction.

FIG. 2A is a diagram showing light beams traveling from the collimator lenses 14-1 to 14-$m$ to a concave mirror 16 as seen in the x-axis direction. FIG. 2B is a diagram showing light beams traveling from the concave mirror 16 to a wavelength dispersion element 17 as seen in the x-axis direction. FIG. 2C is a diagram showing light beams incident on a concave mirror 18. FIG. 2D is a diagram showing light beams traveling between the concave mirror 18 and a wavelength selection element 19. It is noted that, in FIG. 2A, although neither of the optical fibers nor the circulators are represented graphically, the configuration for each channel is same as that shown in FIG. 1B. As shown in a part (b) of FIG. 10 and FIG. 2B, the beams of WDM light of all the channels are incident on the concave mirror 16 acting as the first light condensing element. The concave mirror 16 condenses those WDM light beams into a spot at a focal point, and the condensed light is incident on the wavelength dispersion element 17 placed at the light condensing position as shown in a part (c) of FIG. 10. The wavelength dispersion element 17 disperses light beams in different directions with respect to the x-axis direction according to their wavelengths. Herein the wavelength dispersion element 17 may be constructed of a diffraction grating or a prism, or may be constructed of a combination of a diffraction grating and a prism. The dispersed light beams from the wavelength dispersion element 17 are fed to the concave mirror 18 acting as the second light condensing element. As shown in a part (d) and a part (e) of FIG. 1C and FIG. 2D, the concave mirror 18 is a light condensing element for condensing light beams dispersed on an xy plane in the y-axis direction. The condensed light is incident on a wavelength selection element 19.

It is noted that, in FIG. 1A, there are shown WDM light beams of the first channel having the shortest wavelength $\lambda_1$ and the longest wavelength $\lambda_n$ by way of example. However, incoming light is essentially WDM signal light having a multiplicity of spectra in a range from the wavelength $\lambda_1$ to the wavelength $\lambda_n$, and thus in reality the beams of WDM signal light corresponding to m channels developed over the xz plane are each directed, in a strip-like form, to the wavelength selection element 19 as shown in the part (e) of FIG. 1C. The wavelength selection element 19 effects reflection of incoming light in a selective manner. The selection characteristics of the optical filter are determined on the basis of the reflection characteristics of the wavelength selection element 19, which will hereinafter be described in detail. The light beams reflected from the wavelength selection element 19 pass through the same path to enter the concave mirror 18, and are then directed to the wavelength dispersion element 17 once again. In the wavelength dispersion element 17, the reflected light is caused to converge in the same direction as the convergence direction of the original incoming light, and the converging light is incident on the concave mirror 16. The concave mirror 16 turns the light into light beams parallel to the z axis in the same path as that taken by the incoming light, and the light beams exit, through their respective collimator lenses 14-1 to 14-*m*, to their respective optical fibers 13-1 to 13-*m*. The light beams are then outputted to their respective optical fibers 15-1 to 15-*m* by their respective circulators 12-1 to 12-*m*. Herein the optical fibers 11-1 to 11-*m*, 13-1 to 13-*m*, and 15-1 to 15-*m*, the circulators 12-1 to 12-*m*, the collimator lenses 14-1 to 14-*m*, and the concave mirror 16 constitutes an entrance/exit sections for receiving WDM signal light beams of m channels and allowing the exit of selected light. It is noted that the circulators 12-1 to 12-*m* do not necessarily have to be fiber-type circulators. When using spatial-type circulators, there is no need to provide the optical fibers 13-1 to 13-*m*.

According to this embodiment, a concave mirror is used for each of the two light condensing elements. This affords the advantage to constitute an optical system in the presence of a distance equivalent to the focal length of the concave mirror, as well as to achieve miniaturization of the apparatus as a whole.

Second Embodiment

Figure 3:
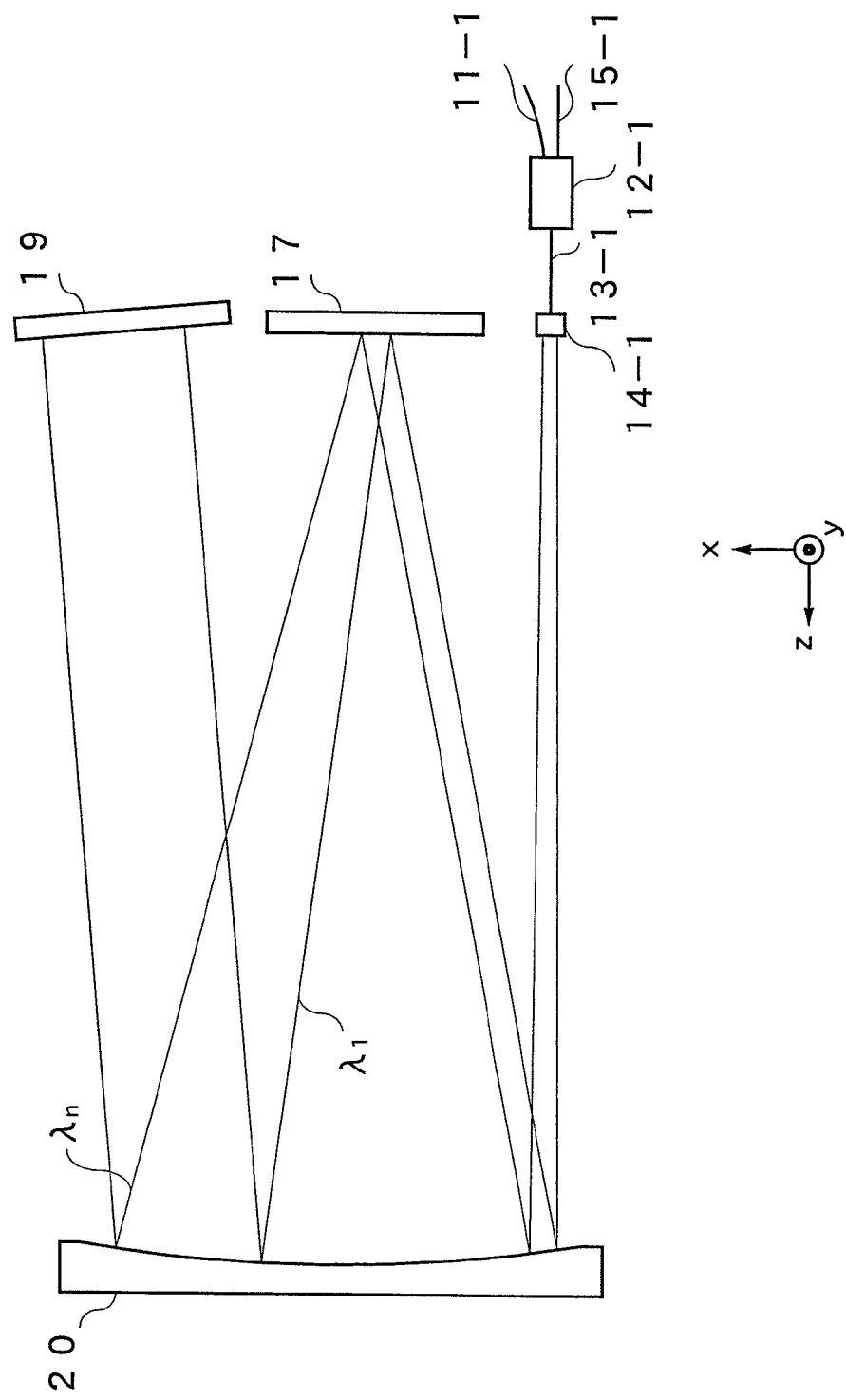
FIG. 3 is a diagram showing the optical arrangement of the reflection-type optically variable filter array apparatus in accordance with a second embodiment of the present invention as seen in the y-axis direction.

Next, a description will be given as to the reflection-type optically variable filter array apparatus in accordance with a second embodiment of the present invention. FIG. 3 is a side view showing the configuration of optical elements constituting the optically variable filter array apparatus in accordance with the second embodiment of the present invention as seen in the y-axis direction. Such constituent components as are common to the first embodiment will be identified with the same reference symbols. In this embodiment, a single concave mirror 20 is used for the first and second light condensing elements. The concave mirror 20 is similar in capability to the concave mirrors 16 and 18 of the first embodiment, wherefore the same effects as achieved in the first embodiment can be obtained.

Third Embodiment

Figure 4:
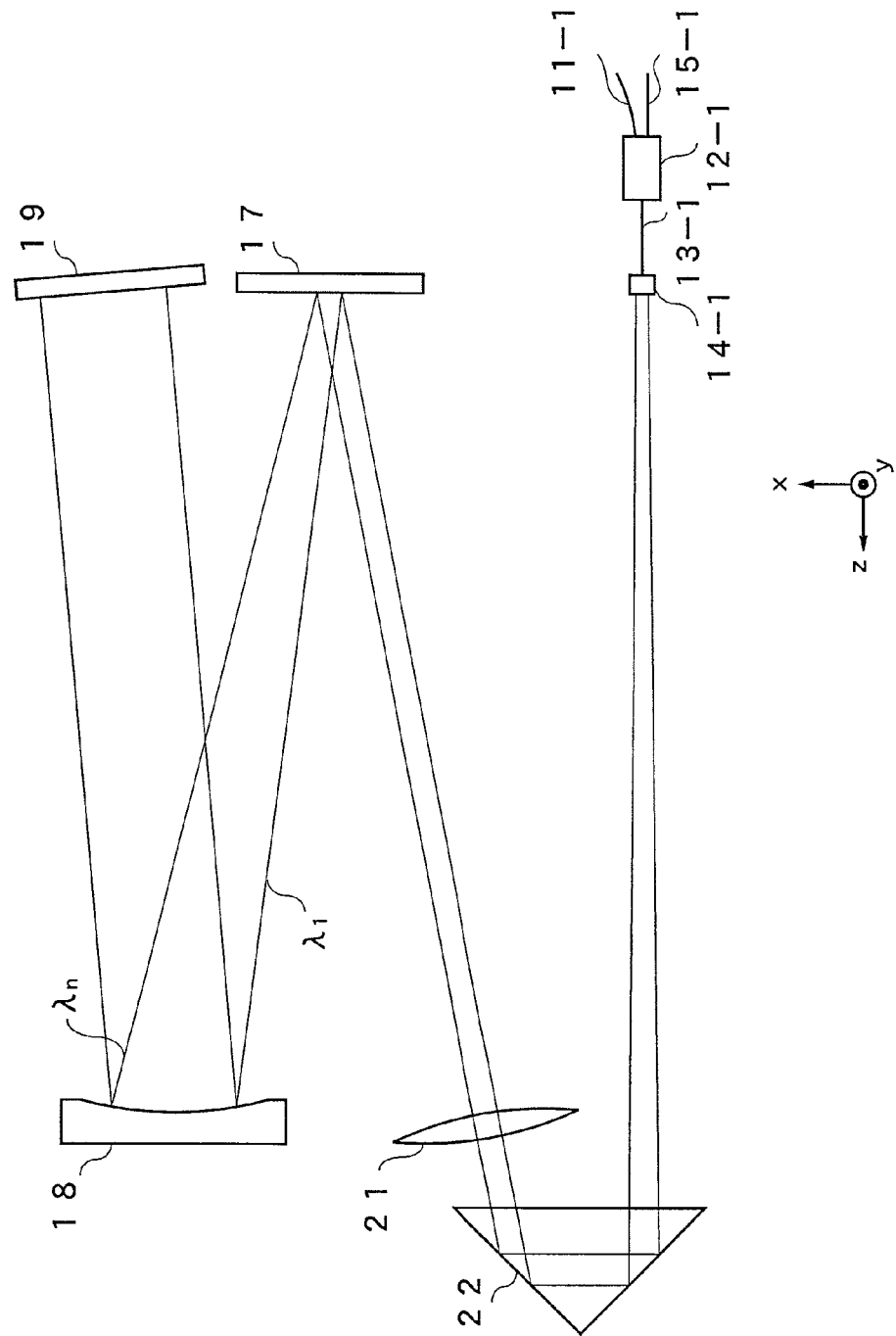
FIG. 4 is a diagram showing the optical arrangement of the reflection-type optically variable filter array apparatus in accordance with a third embodiment of the present invention as seen in the y-axis direction.

Next, a description will be given as to the reflection-type optically variable filter array apparatus in accordance with a third embodiment of the present invention. FIG. 4 is a side view showing the configuration of optical elements constituting the optically variable filter array apparatus in accordance with the third embodiment of the present invention as seen in the y-axis direction. Such constituent components as are common to the first embodiment will be identified with the same reference symbols. In this embodiment, as the first light condensing element, a light condensing lens (a convex lens) 21 is used in lieu of the concave mirror 16. In addition, an optical-path turning element 22 is used to turn light so that its optical axis is aligned with the direction of a −z axis. Otherwise, the third embodiment is the same as the preceding first embodiment. In this case, the use of a lens will not lead to an increase in the size of the optical system, wherefore the same effects as achieved in the preceding embodiment can be obtained. It is noted that the optical-path turning element 22 may be constructed of a reflection mirror or a prism.

Fourth Embodiment

Figure 5:
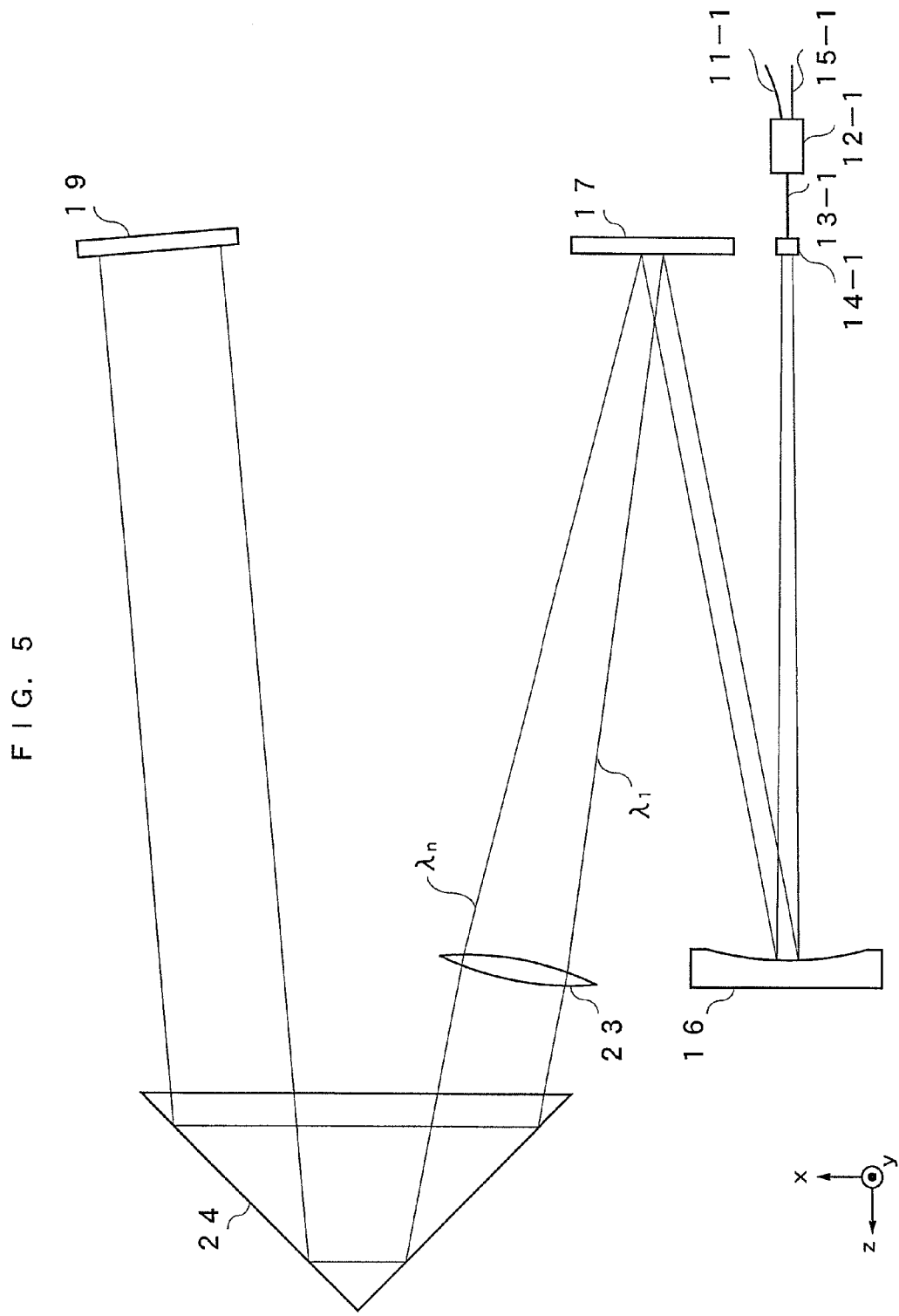
FIG. 5 is a diagram showing the optical arrangement of the reflection-type optically variable filter array apparatus in accordance with a fourth embodiment of the present invention as seen in the y-axis direction.

Next, a description will be given as to the reflection-type optically variable filter array apparatus in accordance with a fourth embodiment of the present invention. FIG. 5 is a side view showing the configuration of optical elements constituting the optically variable filter array apparatus in accordance with the fourth embodiment of the present invention as seen in the y-axis direction. Such constituent components as are common to the first embodiment will be identified with the same reference symbols. In this embodiment, as the second light condensing element, a light condensing lens 23 is used in lieu of the concave mirror 18. In addition, an optical-path turning element 24 is used to turn light which passed through the light condensing lens 23 so that its optical axis is aligned with the −z axis direction. Otherwise, the fourth embodiment is the same as the preceding first embodiment. Also in this case, the use of a lens will not lead to an increase in the size of the optical system, wherefore the same effects as achieved in the preceding embodiment can be obtained. It is noted that the optical-path turning element 24 may be constructed of a reflection mirror or a prism.

(Configuration of Wavelength Selection Element)

Figure 6:
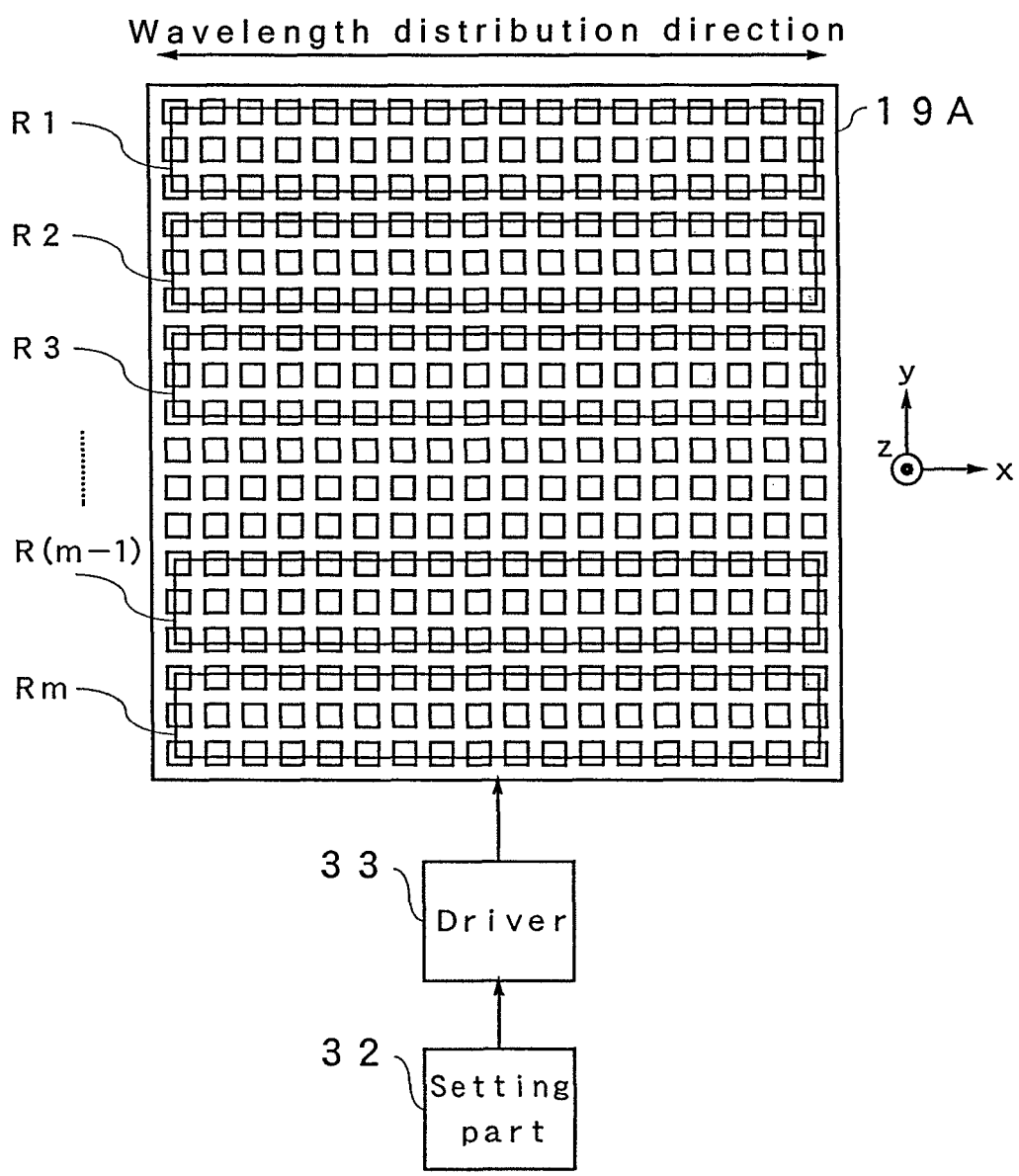
FIG. 6 is a diagram showing an LCOS element employed in the optically variable filter array apparatus in accordance with the first to fourth embodiments of the present invention.

Next, the wavelength selection element 19 employed in the reflection-type optically variable filter array apparatus in accordance with the first to forth embodiments will be explained. As shown in FIG. 6, the wavelength selection element 19 is designed as an element having a structure composed of pixels two-dimensionally arranged in a K- by L-dot matrix. Moreover, a setting section 32 is connected, via a driver 33, to the wavelength selection element 19. The setting section 32 determines which pixel is used to reflect light on the xy plane in accordance with a selected wavelength of a selected channel. The setting section 32 and the driver 33 constitute a wavelength selection element driving unit for driving the electrode of each of the pixels arranged in the x-y directions of the wavelength selection element, so that the light reflection characteristics of a pixel at a predetermined position in the x-axis and y-axis directions can be controlled.

In the first and second embodiments, when WDM light corresponding to the first to the m-th channels is dispersed in the y-axis direction according to channel and also dispersed in the x-axis direction according to wavelength so as to be incident on the wavelength selection element 19 as m pieces of parallel light beams in a strip-like form, then incident regions R1 to Rm for receiving the light beams of the first to the m-th channels are each assumed to be a rectangular region as shown in FIG. 6. That is, the light beams applied to the incident regions R1 to Rm are essentially the WDM light beams of the first to the m-th channels developed over the xy plane according to channel i (i=1 to m) and wavelength band $\lambda_j$ (j=1 to n). In the optically variable filter array apparatus in accordance with the first and second embodiments, the selection of light having a desired wavelength can be made by choosing corresponding pixels for reflection. Next, the specific configuration of the wavelength selection element 19 will be explained.

The wavelength selection element 19 can be practically realized by using an LCOS (Liquid Crystal On Silicon)-based LC element. An LCOS element 19A has a built-in liquid crystal modulation driver located at the back of each pixel. Accordingly, the number of pixels can be increased, and thus, for example, the LCOS element 19A can be formed of a multiplicity of pixels arranged in a 1000×1000 lattice pattern. In the LCOS element 19A, since light beams are incident separately at different positions according to channel and wavelength, by bringing a pixel corresponding to the incident position of a target light beam into a reflective state, it is possible to select the optical signal thereof.

Now, as one of modulation modes applicable to the LCOS element 19A, a phase modulation mode will be explained.

Figure 7A:
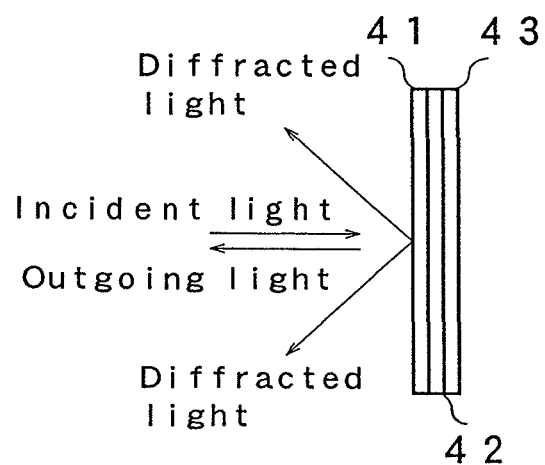
FIG. 7A is a diagram showing an example of a modulation mode for the LCOS element employed in the first and second embodiments of the present invention.

FIG. 7A is a schematic diagram showing the LCOS element 19A. The LCOS element 19A is composed of a transparent electrode 41, a liquid crystal 42, and a back reflection electrode 43 that are arranged in the order named, from the plane of incidence's side, along the z-axis direction in a layered structure. In the LCOS element 19A, since a plurality of pixels are assigned to constitute a single wavelength band of a single channel, it is possible to impart unevenness to a refractive index profile with respect to a plurality of pixels and thereby develop a diffraction phenomenon. Accordingly, by applying a voltage between the transparent electrode 41 and the back reflection electrode 43, the angles of diffraction of different frequency components can be controlled independently, so that input light with a specific wavelength can be simply reflected in the incident direction, and light of another wavelength components can be diffracted as unnecessary light and reflected in a direction different from the incident direction. Therefore, by controlling a voltage to be applied to each pixel, necessary pixels can be brought into a regularly-reflective state without causing diffraction.

Figure 7B:
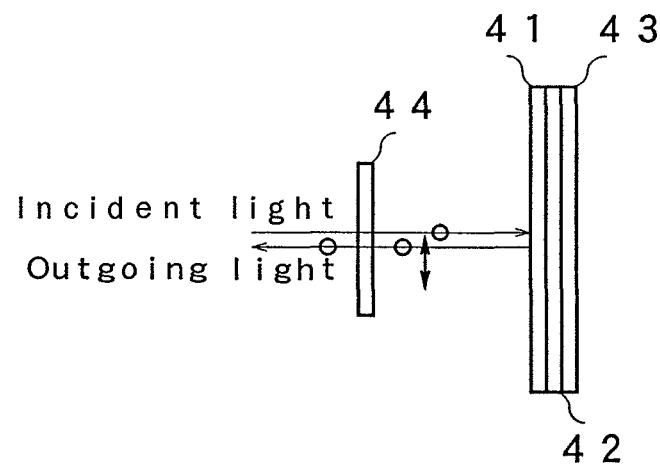
FIG. 7B is a diagram showing another example of the modulation mode for the LCOS element employed in the first and second embodiments of the present invention.

Next, as another modulation mode applicable to the LCOS element 19A, an intensity modulation mode will be explained. FIG. 7B is a diagram showing a wavelength selection method based on the intensity modulation mode. A polarizer 44 is placed on the plane of incidence for incoming light and outgoing light as well. The polarizer 44 brings incoming light into a specific polarized state as indicated by an circle in the diagram, and the polarized light is incident on the LCOS element 19A of reflection type. Also in this case, the LCOS element 19A is composed of a transparent electrode 41, a liquid crystal 42, and a back reflection electrode 43. With the incidence of light on the LCOS element 19A, a difference in index of double refraction in the liquid crystal between the electrodes can be controlled on the basis of the conditions of voltage application. Accordingly, the polarization state of reflected light can be varied by adjusting to-be-applied voltages independently. Then, it is determined whether the plane of polarization is rotated or retained at the time of voltage control in accordance with orientational ordering among liquid-crystal molecular components. For example, assuming that the plane of polarization is retained in the absence of voltage application, then the light indicated by the circle is simply reflected. On the other hand, in the presence of voltage application, the plane of polarization is rotated to effect reflection, and the reflected light is shielded by the polarizer 44. Therefore the selection of incoming light can be achieved by controlling voltages to be applied to the pixels. The selection of a plurality of given wavelength bands of a plurality of given WDM signal light beams can be made by bringing a given number of corresponding pixels into a reflective state.

Figure 8A:
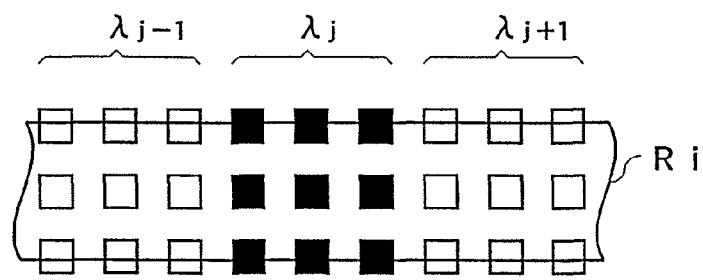
FIGS. 8A to 8D are diagrams showing how the LCOS element is to be driven.
Figure 9A:
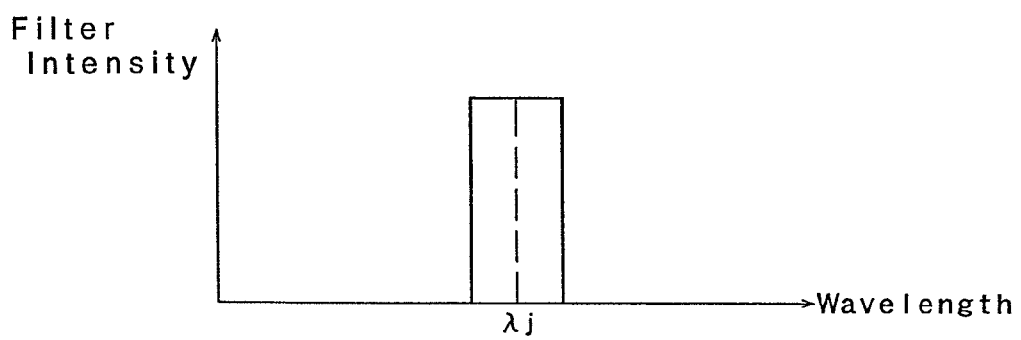
FIGS. 9A to 9D are diagrams showing the selection characteristics of the filter corresponding to the driving conditions of the LCOS element.

The LCOS element 19A employed in the first and second embodiments has, for example, a 3 m×3 n pixel arrangement with respect to WDM signals of m channels each having n wavelength bands ranging from $\lambda_1$ to $\lambda_n$. In this way, when it is desired to select a specific wavelength of a WDM signal corresponding to a specific channel, for example, a signal in a wavelength band $\lambda_j$ of WDM light corresponding to a channel i as shown in FIG. 8A, by bringing 9 dots of pixels, namely 3i to 3i+2 and 3j to 3j+2, into a regularly-reflective state, the wavelength of the channel i can be selected. In FIG. 8A, a pixel to be brought into a reflective state is represented as a black box. When light is incident on a pixel in a reflective state of the LCOS element 19A, then the incident light is simply reflected therefrom to be acquired at the output side. Meanwhile, light with a non-target wavelength incident on an unselected pixel is diffracted or shielded and is therefore no longer return to the optical fibers 15-1 to 15-m. Thus, in the case of selecting 9 pixels corresponding to a specific wavelength band, as shown in FIG. 9A, as a filter configuration, there is obtained a flat-top type spectral waveform pattern characterized by inclusion of signal spectral components and low crosstalk between adjacent channels.

Figure 8B:
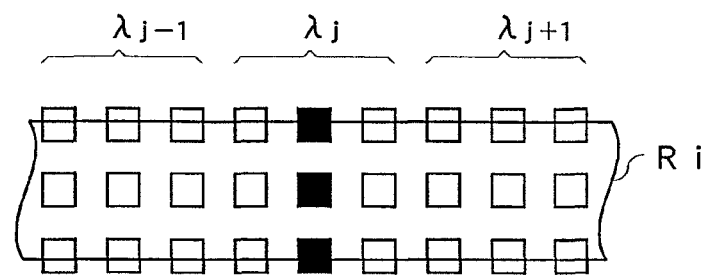
Figure 9B:
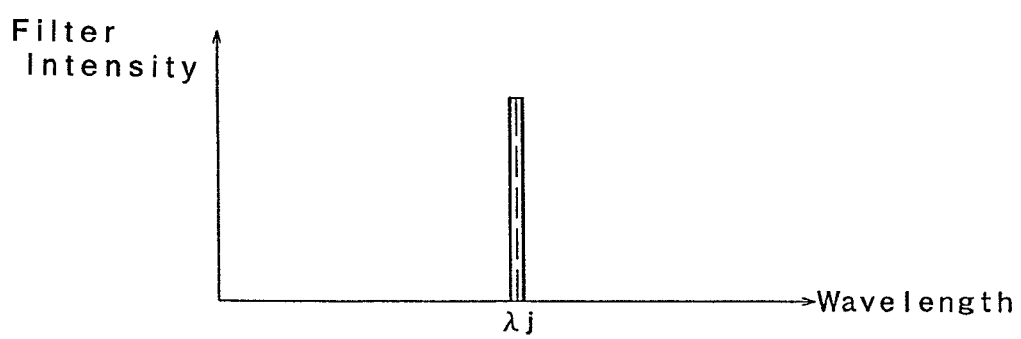

Moreover, in the LCOS element 19A, the filter configuration can be determined freely by adjusting the number of pixels to be brought into an ON state as well as an OFF state. That is, in FIG. 8A, by selecting one of the pixels placed in a 3×3 arrangement corresponding to a specific wavelength band of a specific channel, it is possible to keep the filter at a low level in respect of its transmittance. Further, by selecting part of the 9 pixels covering the wavelength band $\lambda_j$ of the channel i in the wavelength selection element 19, it is possible to obtain a desired wavelength. In this way, when light is incident on the wavelength selection element 19, a passband width corresponding to the width of the reflection region can be obtained. That is, as shown in FIG. 8B, out of the 9 pixels covering the wavelength band $\lambda_j$ of the channel i, centrally located 3 pixels are brought into a reflective state. This makes it possible to attain narrow-range selection characteristics as shown in FIG. 9B for selecting wavelengths forming central portions of the wavelength band $\lambda_j$.

Figure 8C:
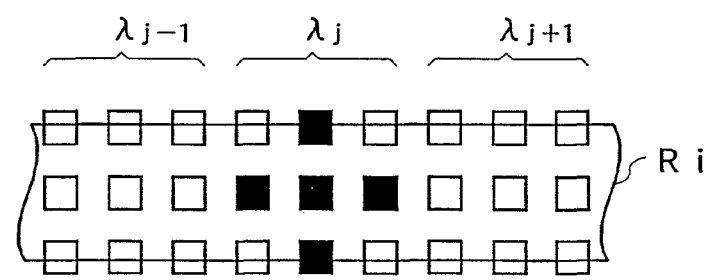
Figure 9C:
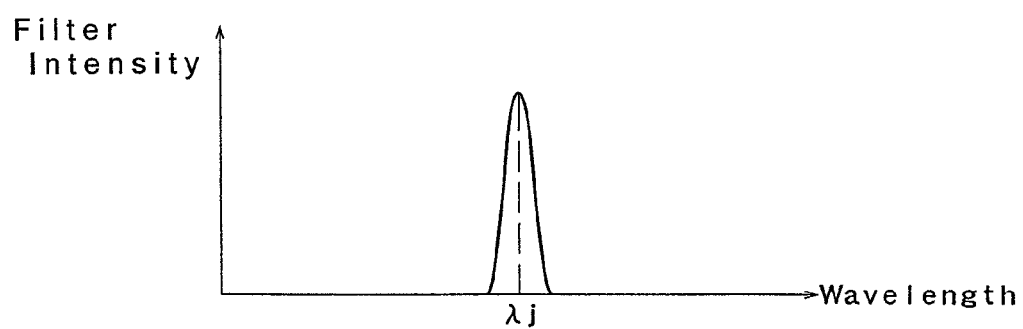

Moreover, as shown in FIG. 8C, pixels adjacent to the central 3 pixels are also brought into a reflective state at the same time. This makes it possible to attain near-Gaussian selection characteristics as shown in FIG. 9C in which the passband is slightly widened.

Figure 8D:
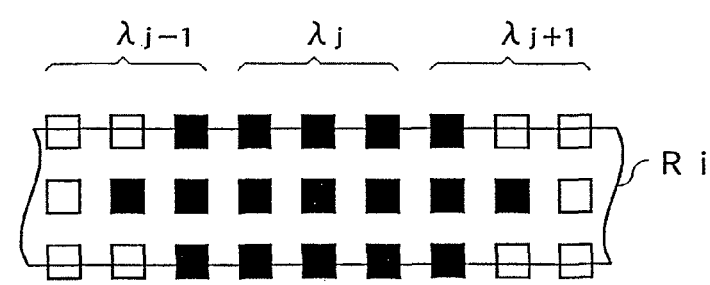
Figure 9D:
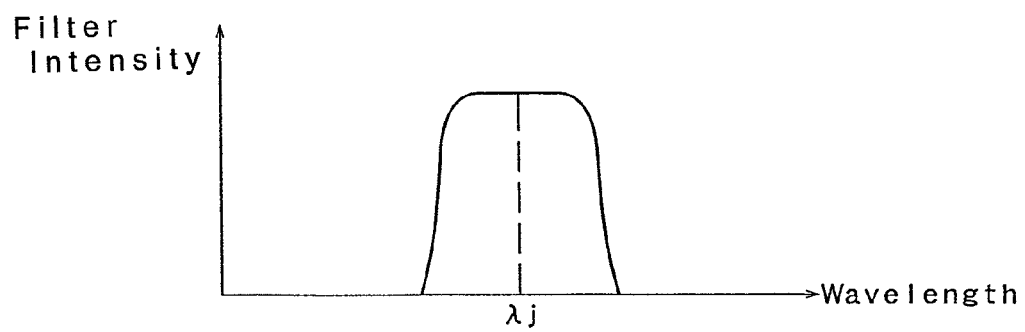

Further, as shown in FIG. 8D, in addition to the 9 pixels covering the wavelength band $\lambda_j$, part of the pixels adjacent thereto is also brought into a reflective state. This makes it possible to render the passband even wider as shown in FIG. 9D.

The transmittance can be continuously varied by adjusting the level of a voltage to be applied to each of the pixels of the LCOS element 19A. Accordingly, by controlling pixels subjected to voltage application and voltage level, various filter characteristics can be attained.

It is noted that, although the pixels placed in the 3×3 arrangement are assigned to each wavelength band of a single channel of a WDM signal in the first to forth embodiments, by increasing the number of pixels to be assigned or by exercising voltage level control on a pixel-by-pixel basis, it is possible to control filter characteristics more precisely.

Figure 10:
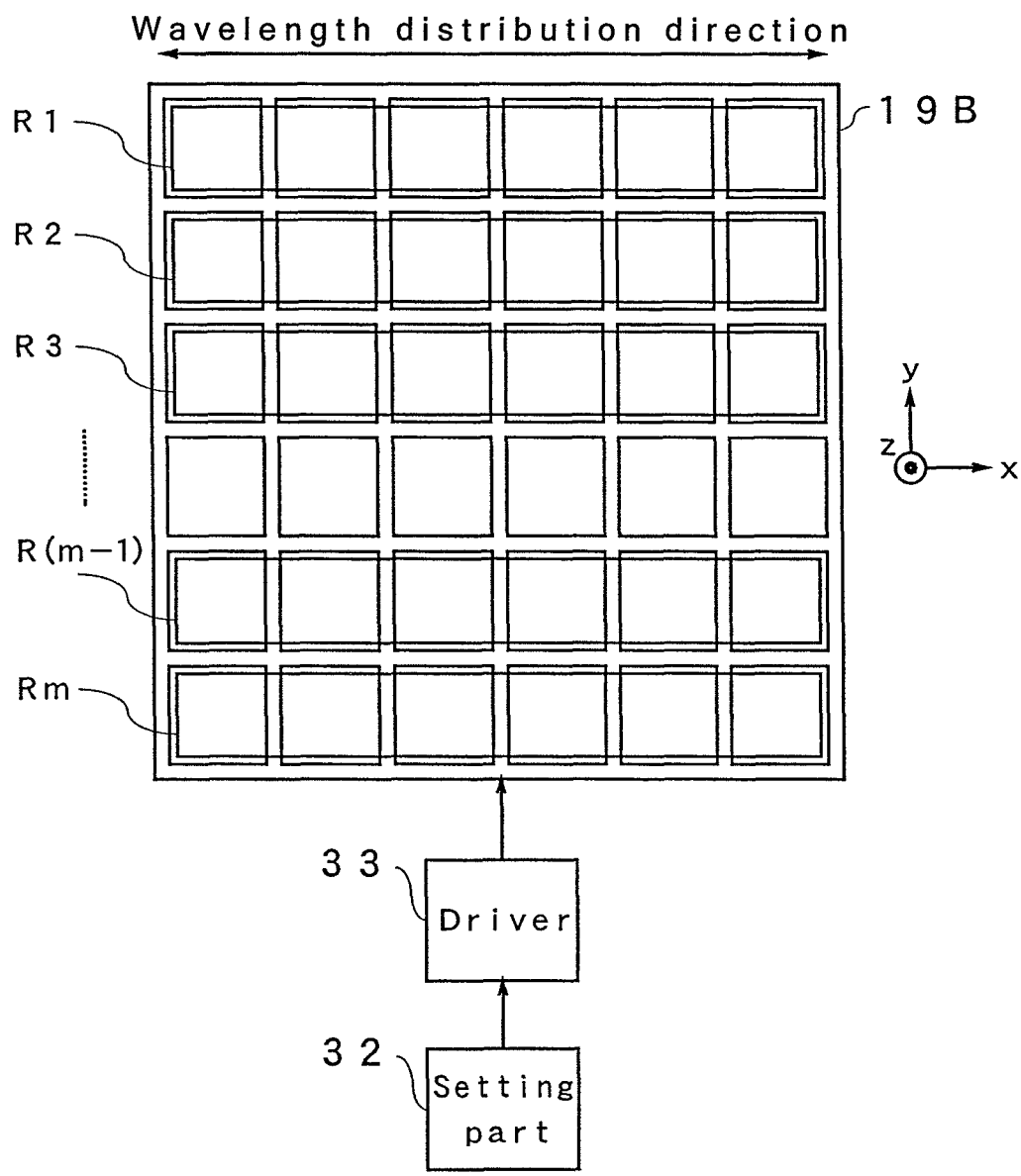
FIG. 10 is a diagram showing an example of a 2D electrode array in accordance with the first and second embodiments of the present invention.

Moreover, as the wavelength selection element 19, a liquid crystal element 19B can also be used that has a 2D electrode array instead of a LCOS structure. In the LCOS element, there is incorporated a liquid crystal driver located at the back of each pixel. On the other hand, in the 2D-electrode array liquid crystal element 19B, a driver 33 for liquid crystal modulation is disposed externally of the element. This makes it difficult to provide as many pixels as provided in the LCOS element. Accordingly, it is desirable to adopt a m×n pixel arrangement as shown in FIG. 10 in conformity with a two-dimensional m×n development of n wavelengths ranging from $\lambda_1$ to $\lambda_n$ of WDM light corresponding to m channels. In this case, although the filter configuration cannot be changed, desired wavelength bands of a plurality of arbitrarily selected channels from among m channels can be selected. Moreover, in this case, only the foregoing intensity modulation mode can be implemented. Further, the level of transmission can be varied by making changes to the level of voltages to be applied to the pixels.

Figure 11:
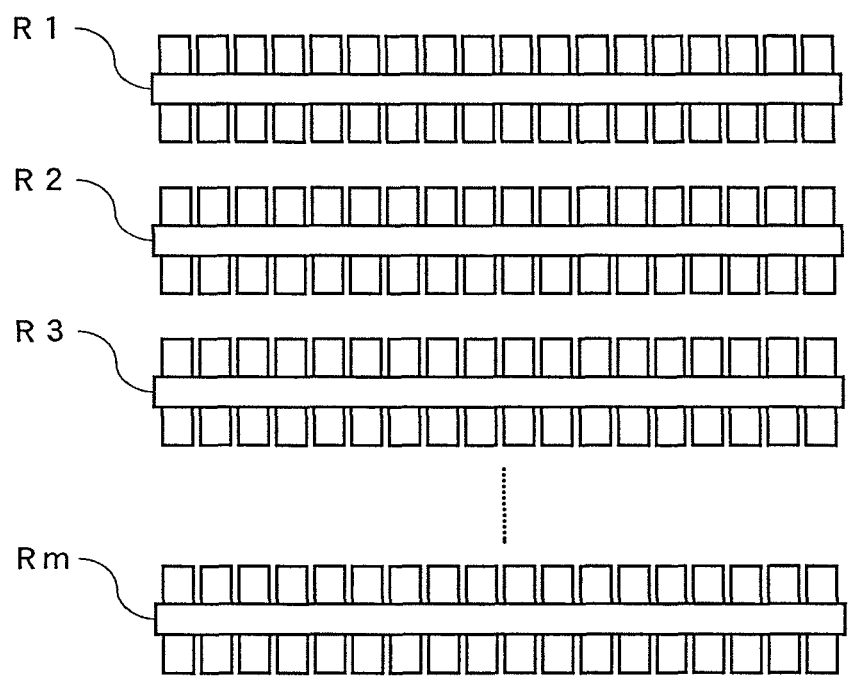
FIG. 11 is a diagram showing an example of a MEMS element in accordance with the first and second embodiments of the present invention.
Figure 12:
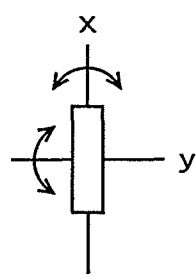
FIG. 12 is a diagram showing a single pixel of the MEMS element of the embodiment.

Moreover, the wavelength selection element 19 can be constructed of a MEMS element 19C. In this case, as shown in FIG. 11, a multiplicity of MEMS mirrors formed of MEMS elements are arranged at different positions on the xy plane according to channel and wavelength. At this time, each of the pixels of the MEMS mirror is assigned to a single wavelength of WDM signal light on a one-on-one basis. In this way, as shown in FIG. 12, by rotating each of the pixels of the MEMS element 19C about the x axis or the y axis, it is possible to eliminate unnecessary WDM signals and thereby select necessary WDM signals only. Also in this case, a plurality of wavelength bands can be selected arbitrarily with respect to WDM light corresponding to a plurality of given channels. Moreover, the angle of a mirror can be adjusted by changing the level of a voltage to be applied to each pixel, wherefore the amount of light transmission can be determined freely. Accordingly, also in this case, the intensity level of light in a selected wavelength band can be controlled. Moreover, in the case of adopting MEMS, pixels of a plurality of MEMS elements can be assigned to a single wavelength band. By doing so, just as with the LCOS element, by controlling voltages to be applied to the pixels corresponding to a single wavelength band, wavelength selection characteristics of various filter configurations can be attained.

It is noted that, in a case where the optical power efficiency of the wavelength dispersion element is polarization-dependent, a polarized-wave control element constructed of a polarization control component, such as a wave plate, a polarizer, and a faraday rotator, should preferably be disposed in an appropriate location on the path of light, so that light can be incident on the wavelength dispersion element in the form of linearly-polarized light, which is favorable from the viewpoint of the optical power efficiency of the wavelength dispersion element. Moreover, in a case where an electro-optic effect produced in liquid crystal is exploited for the wavelength selection element, the electro-optic effect is generally known for its polarization dependency. Also in this case, a polarized-wave control element constructed of a polarization control component, such as a wave plate, a polarizer, and a faraday rotator, should preferably be disposed in an appropriate location on the path of light, so that light can be incident on the wavelength selection element in the form of linearly-polarized light, which is conducive to efficient development of the electro-optic effect. Further, the circulator is not limited to an optical fiber-type circulator, but may be of a spatial-type circulator. Still further, the light condensing lens may be of an aspherical lens, and, in another alternative, a spherical lens, an achromatic lens, and so forth may be used instead.

As particularized heretofore, according to the present invention, by using a concave mirror as at least one of light condensing elements, the optical system can be made smaller in size. Moreover, by making various changes to the reflection characteristics and transmission characteristics of the wavelength selection element, it is possible to select light having a desired wavelength with respect to each of multi-channel WDM signals on an individual basis. Further, the use of a wavelength selection element having a plurality of bits assigned to each wavelength makes it possible to vary wavelength selection characteristics freely. Thus, the optically variable filter array apparatus can be used as a main constituent component of a node having WDM light Add-Drop function.

What is claimed is:

1. An optically variable filter array apparatus comprising:
   an entrance/exit section for a plurality of channels arranged along a y axis, which receives WDM signal light beams of a first to m-th channels, each of which is composed of multi-wavelength light, and allows exit of optical signals of selected wavelengths on a channel to channel basis;
   a first light condensing element which condenses said WDM signal light beams of different channels;
   a wavelength dispersion element which spatially disperses said WDM light beams condensed by said first light condensing element according to their wavelengths;
   a second light condensing element which condenses said WDM light beams of different channels dispersed by said wavelength dispersion element;
   a wavelength selection element which has a multiplicity of pixels that are arranged in a direction of an x axis according to wavelength, are placed so as to receive incoming beams of m channels arranged at different positions with respect to the y axis so as to be developed over an xy plane, and are arranged in a lattice pattern on the xy plane, and which selects light in a desired number of wavelength bands with respect to said light beams by changing reflection characteristics of each of the pixels arranged in a two-dimensional fashion; and
   a wavelength selection element driving unit which drives an electrode for each of the pixels arranged in the x-y directions of said wavelength selection element to control light reflection characteristics of a pixel lying at a predetermined position in the x-axis direction as well as in the y-axis direction,
   wherein at least one of said first light condensing element and second light condensing element is of a concave mirror.

2. The optically variable filter array apparatus according to claim 1, wherein
   said first light condensing element and said second light condensing element are each constructed of a single concave mirror.

3. The optically variable filter array apparatus according to claim 1, wherein
   said first light condensing element has a light condensing lens and an optical-path turning element for turning a path of light.

4. The optically variable filter array apparatus according to claim 1, wherein
   said second light condensing element has a light condensing lens and an optical-path turning element for turning a path of light.

5. The optically variable filter array apparatus according to claim 1, wherein
   said wavelength selection element is a two-dimensional liquid crystal element, and said wavelength selection element controls a voltage to be applied to each pixel in accordance with a wavelength of a channel to be selected.

6. The optically variable filter array apparatus according to claim 5, wherein
   said wavelength selection element is an LCOS element.

7. The optically variable filter array apparatus according to claim 6, wherein
   said LCOS element is so designed that a plurality of pixels are assigned to a position at which light in a single wavelength band of a single channel of a WDM signal is incident.

8. The optically variable filter array apparatus according to claim 5, wherein
   said wavelength selection element is a two-dimensional liquid crystal array element.

9. The optically variable filter array apparatus according to claim 1, wherein
   said wavelength selection element is a MEMS array having a plurality of pixels arranged in a two-dimensional fashion.

* * * * *